United States Patent
Matejka et al.

(10) Patent No.: US 8,538,947 B2
(45) Date of Patent: Sep. 17, 2013

(54) METHOD OF PROVIDING INSTRUCTIONAL MATERIAL WHILE A SOFTWARE APPLICATION IS IN USE

(75) Inventors: Justin Frank Matejka, Etobicoke (CA); Tovi Grossman, Toronto (CA); George Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 32 days.

(21) Appl. No.: 13/083,312

(22) Filed: Apr. 8, 2011

(65) Prior Publication Data
US 2012/0259845 A1 Oct. 11, 2012

(51) Int. Cl.
*G06F 7/00* (2006.01)
(52) U.S. Cl.
USPC ........... 707/707; 707/722; 707/723; 707/899; 715/705
(58) Field of Classification Search
USPC ................... 707/707, 722, 723, 899; 715/705
See application file for complete search history.

(56) References Cited

U.S. PATENT DOCUMENTS

| | | | |
|---|---|---|---|
| 5,754,176 A | 5/1998 | Crawford | |
| 7,865,829 B1 * | 1/2011 | Goldfield et al. | 715/708 |
| 2007/0214425 A1 * | 9/2007 | Bala et al. | 715/764 |
| 2009/0234727 A1 | 9/2009 | Petty | |
| 2010/0131452 A1 * | 5/2010 | Fitzmaurice et al. | 706/54 |
| 2010/0229080 A1 | 9/2010 | Roulland et al. | |

OTHER PUBLICATIONS

International Search Report, Application No. PCT/US 12/32390, dated Jun. 22, 2012.

* cited by examiner

*Primary Examiner* — Hung Q Pham
(74) *Attorney, Agent, or Firm* — Patterson & Sheridan, L.L.P.

(57) ABSTRACT

An ambient help application selects and displays learning resources to an end-user of a software application that are relevant to the current activities of the end-user in the software application. The ambient help application selects the learning resources based on computed relevance scores of each learning resource and displays the learning resources in a dedicated help space. The learning resources may include video- and text-based instructional information, and may be sized and positioned in the help space according to relevance score.

20 Claims, 6 Drawing Sheets

METHOD OF PROVIDING INSTRUCTIONAL MATERIAL WHILE A SOFTWARE APPLICATION IS IN USE

BACKGROUND OF THE INVENTION

1. Field of the Invention

The present invention generally relates to software usage and, more specifically, to a method and system for providing instructional information to software application end-users.

2. Description of the Related Art

A wide variety of software applications are currently available to end-users, including computer-aided design (CAD) applications, computer graphics applications, animation applications, word processing applications, and computer programming applications, among others. Many of these software applications allow an end-user to interact with the software application via a graphical end-user interface (GUI). Conventional GUIs often provide the end-user with access to a set of tools that can be used to perform various operations within a workspace generated by the software application. For example, a CAD application could provide a set of drawing tools that could be used to draw different shapes within a drawing workspace generated by the CAD application. Each tool in the set of tools could be represented within the GUI with an icon that the end-user could select in order to use the tool.

Despite advances in making complex applications easier to operate, learning how to use such applications can still be problematic. More complex applications, for example the CAD application described above, often have thousands of commands or functions to choose from, and many more ways for an end-user to combine the different functions into workflows. When using an unfamiliar area of such an application, even expert end-users may require assistance.

Consequently, software applications may provide the end-user with instructional information that assists in using the different tools associated with the software application. For example, the software application may include a "help" database that receives a query from the end-user and then identifies articles that relate to the received query. Those articles may then be displayed to the end-user. One problem with conventional help databases is that access thereto is based on a "pull" model, in which the end-user is required to open a new window in order to submit a query to the help database. Therefore, when the end-user is actively working within a workspace generated by the software application and needs to access instructional information pertaining to that work, the end-user is required to stop working in order to access the help database. Such interruptions may inhibit the productivity of the end-user. Another problem with conventional help databases is that a pull model for requesting help does not take into consideration other factors that may indicate the most pertinent instructional information that should be provided to the end-user, and instead only relies on explicit requests for information made by the end-user.

As the foregoing illustrates, there is a need in the art for a more effective way to provide end-users of a software application with information related to usage of the software application.

SUMMARY OF THE INVENTION

One embodiment of the present invention sets forth a computer-implemented method for providing instructional information to an end-user of a software application. The method includes the steps of receiving contextual information associated with the software application, computing a relevance score for each of a plurality of learning resources based on the relevance of each learning resource to the contextual information, based on the relevance scores, selecting one or more learning resources, and displaying to the end-user the one or more learning resources in a help space within a display window.

One advantage of the disclosed method is that relevant instructional information can be displayed in a non-distracting fashion for an end-user without a specific request from the end-user for help information. Another advantage is that the end-user can be exposed to relevant instructional material even when the end-user is unaware that instructional material is relevant to and/or helpful for the current end-user activity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
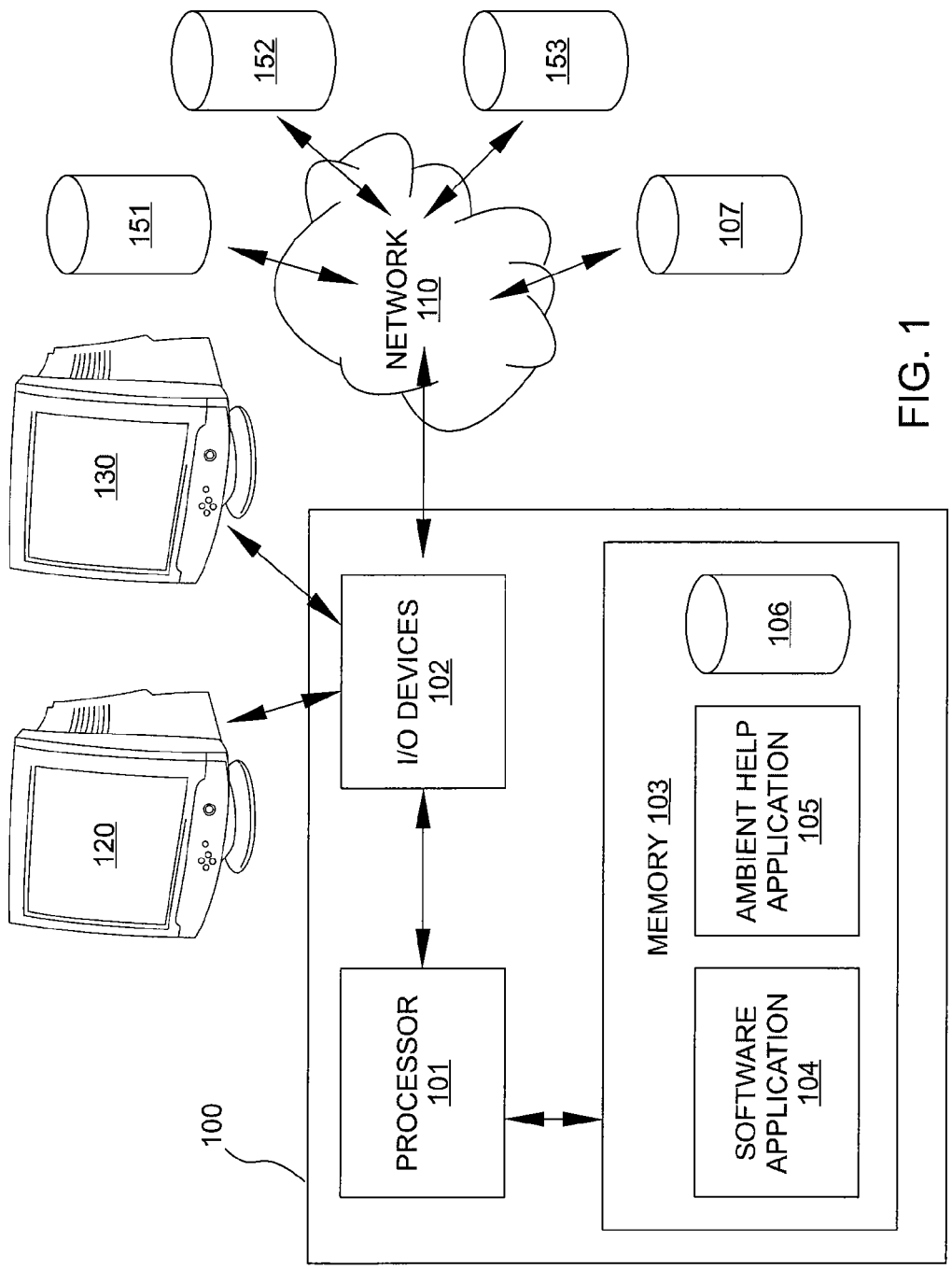
FIG. 1 illustrates a block diagram of a computing device configured to implement one or more embodiments of the present invention.

FIG. 1 illustrates a block diagram of a computing device 100 configured to implement one or more embodiments of the present invention. Computing device 100 may be a desktop computer, a laptop computer, a smart phone, a personal digital assistant (PDA), tablet computer, or any other type of computing device configured to receive input, process data, and display images. Computing device 100 includes a processor 101, input/output (I/O) devices 102, and a memory block 103, and is configured to run a software application 104 that resides in memory block 103. Computing device 100 receives input from an end-user and displays graphical images to the end-user via I/O devices 102.

Processor 101 may be any suitable processor implemented as a central processing unit (CPU), a graphics processing unit (GPU), an application-specific integrated circuit (ASIC), a field programmable gate array (FPGA), or another type of processing unit. Processor 101 is configured to execute program instructions associated with a particular instruction set architecture (ISA) specific to processor 101, including a software application 104 and, in some embodiments, an ambient help application 105. Processor 101 is also configured to receive data from and transmit data to I/O devices 102 and memory 103.

I/O devices 102 include devices that may be used to input data to computing device 100 or devices that output data from computing device 100. I/O devices 102 may include input devices, such as a joystick, a switch, a microphone, a video camera, a keyboard, a mouse, or a touchpad, among others. I/O devices 102 may also include one or more output devices, such as a one or more display screens, a speaker, a projector, or a lamp, among others. In addition, I/O devices 102 include devices used to input data to or output data from computing device 100, such as an Ethernet port, a serial port, a compact disc (CD) drive, or a digital video disc (DVD) drive, among others. In some embodiments, one or more of I/O devices 102 are configured to couple computing device 100 to a network 110.

I/O devices 102 also include a software application display device 120 and an ambient help display device 130. Software application display device 120 may be a computer monitor or other display screen dedicated to presenting an application graphical user interface (GUI) and/or other interface windows associated with software application 104 to facilitate the use thereof by an end-user. An application GUI is described in greater detail below. Ambient help display device 130 may be a computer monitor or other display screen dedicated to presenting an ambient help GUI and/or other interface windows associated with ambient help application 105 and configured to provide an opportunistic learning environment for the and end-user of software application 104. A more detailed embodiment of an ambient help GUI that may be displayed by ambient help display device 130 is described below in conjunction with FIG. 2.

Network 110 may be any technically feasible type of communications network that allows data to be exchanged between computing device 100 and external entities or devices such as resource relevance database 151, learning resource databases 152, 153, and/or user preference database 107. For example, network 110 may include a wide area network (WAN), a local area network (LAN), a wireless (WiFI) network, and/or the Internet, among others.

Memory block 103 may be a hard disk, a flash memory stick, a compact disc read-only memory (CD-ROM), a random access memory (RAM) module, or any other type of volatile or non-volatile memory unit capable of storing data. Memory 103 includes various software programs that can be executed by processor 101, including software application 104 and, in some embodiments, ambient help application 105, as described in greater detail below. In some embodiments, memory block 103 also includes a user preference database 106, which includes user-specific information related to software application 104 that ambient help application 105 may use to create an end-user profile and therefore select more relevant and/or useful learning resources for the end-user. Such user-specific information may include knowledge of end-user proficiency level with respect to software application 104 and history of interactions by the end-user with ambient help application 105, e.g., what learning resources provided by ambient help application 105 have been viewed, replayed, or bookmarked by the end-user.

In some embodiments, a user preference database 107 that is substantially similar and/or identical to user preference database 106 may be located remotely from computing device 100 and connected to computing device 100 via network 110. In some embodiments, user preference database 107 is used and updated by ambient help application 105 in lieu of user preference database 106. In other embodiments, user preference database 107 is used and updated by ambient help application 105 in addition to user preference database 106. In either case, the use of a remotely located user preference database, i.e., user preference database 107, facilitates access to user preference information by ambient help application 105 even when the end-user is running software application 104 on a different computing device than computing device 100.

Software application 104 may be any computer application, such as a computer-aided design (CAD) application, a computer graphics application, an animation application, a word processing application, a computer programming application, and the like. Software application 104 comprises program instructions that can be executed by processor 101. In some embodiments, software application 104 is configured to receive data from an end-user of computing device 100 via a keyboard and mouse, and to display graphical images to the end-user via software application display device 120. Other input devices, such as a touch pad, a digital tablet, etc., may also be used in conjunction with software application 104.

Software application 104 is configured to generate a GUI and to display the GUI to the end-user via software application display device 120. The GUI generated by software application 104 is referred to herein as an "application GUI." The application GUI provides the end-user with access to various tools that allows an end-user of software application 104 to manipulate data, such as graphical data or textual data, among other types of data. For example, when software application 104 is a CAD application, the application GUI may generate a drafting area and provide the end-user with access to various drawing tools that could each be used to draw a particular shape, such as a circle or a hexagon, within the drafting area. Each tool may be represented by a graphical icon within the application GUI. Those skilled in the art will recognize that each tool may be included within software application 104, or, alternatively, may be a stand-alone application that operates in conjunction with software application 104. For example, a given tool may be a plug-in, an add-on, or an in-scene widget configured to be embedded within software application 104 and to cooperate with software application 104. Instructional material corresponding to a given tool may describe the function of the tool, provide suggestions regarding techniques for using the tool, or demonstrate the use of the tool via one or more video clips. Thus, instructional information associated with the tool may assist the end-user when learning to use that tool.

Ambient help application 105 is a software application configured to provide instructional information in a non-distracting fashion to an end-user of software application 104 while the end-user utilizes software application 104. Ambient help application 105 selects and provides context-sensitive instructional information to the end-user without direct user input. In operation, ambient help application 105 monitors the activity of the end-user in software application 104 and thereby determines an application context. Knowledge of the application context allows ambient help application 105 to select the most relevant instructional information from the large quantity of such instructional material that is generally available for any particular software application. To select the relevant instructional information, ambient help application 105 computes relevance scores for each available learning resource via a relevance algorithm using information related to application context. An exemplary relevance algorithm that uses application context to select relevant instructional information is described below.

Because ambient help application 105 directly monitors end-user activity in software application 104 and can access user preference database 106 and/or user preference database 107, application context may include a wide variety of contextual information associated with software application 104. The contextual information can, therefore, be used to accurately indicate the relevance of different learning resources. Such contextual information may include the command or commands that are currently being used in software application 104 by the end-user, content of any document or documents that are being modified with software application 104, application state information related to software application 104, and the expertise level of the end-user with respect to software application 104.

In order to determine application context as the end-user works with software application 104, ambient help application 105 can be configured to detect whenever the end-user issues a command in software application 104, e.g., by clicking a mouse cursor on a button or other element in the application GUI, entering a command on a command line, issuing a command shortcut, entering a command alias, pressing a hot key, or issuing a command from an automated script. In some embodiments, ambient help application 105 may be implemented as a plug-in for software application 104 and configured to receive notification from software application 104 whenever the end-user initiates a command. In another embodiment, ambient help application 105 may be an application running on a separate computing device that is networked to computing device 100 and configured to monitor end-user activity in software application 104.

Other contextual information that ambient help application 105 may include as part of application context is document content. Specifically, when software application 104 is a CAD application, ambient help application 105 can determine the contents of the document the end-user is currently modifying and weight the relevance of more applicable commands accordingly. For example, the relevance of learning resources may be weighted differently in a relevance algorithm when the document being modified is an architectural building plan versus when the document is a three-dimensional mechanical part model. Application state information related to software application 104, e.g., what dialogue windows are open, can also affect the relevance weighting of learning resources. Expertise level of the end-user with respect to software application 104 can also be used by ambient help application 105 to weight the relevance of learning resources differently for different end-users of software application 104.

Another factor that can affect the relevance of different learning resources is the time-weighting of videos that are currently being played by ambient help application 105. In order to prevent videos that are currently playing from being replaced too quickly, a newly displayed video may be given an increased weighting. Conversely, in order to encourage turnover of instructional videos, videos that have been displayed for too long may be given a reduced weighting. For example, a relevance score for a video when first displayed may be multiplied by a time-weighting factor greater than 1, e.g. 1.2. The time-weighting factor then decreases linearly down to 0 after a desired time interval, e.g., five minutes, thereby ensuring that the video in question will be replaced after five minutes.

Other contextual information associated with software application 104 that can affect the relevance of learning resources is how recently a learning resource has been displayed by ambient help application 105. For example, any learning resource among the fifty most recently displayed videos may be excluded from relevance calculations to ensure that the same videos are not played repeatedly for a given command or feature of software application 104. In some embodiments, once a new command is issued by the end-user, the exclusion of previously played videos is ended and any videos with the highest relevance scores are again selected to be played.

End-user preferences and usage history of specific learning resources by the end-user are other categories of contextual information associated with software application 104 that can affect the relevance of learning resources. For example, ambient help application 105 can be configured to record each time a particular user selects a learning resource by moving the cursor thereon, rewinding portions of the video, replaying the entire video, etc. In such embodiments, the selected learning resource can be given a higher relevance score in the future. Learning resources that have been tagged and/or bookmarked by the end-user may be given similar treatment. Such user-specific information can be stored locally in user preference database 106 and/or remotely in user preference database 107. In some embodiments, a specific category of learning resources may be given a higher relevance score for a particular end-user based on the end-user's history of utilizing that category of learning resource, e.g., videos produces by a particular third party.

In some embodiments, ambient help application 105 is configured to receive information from and transmit information to one or more databases via network 110 as part of the process of selecting and retrieving instructional information and other learning resources for the end-user. In FIG. 1, a resource relevance database 151, learning resource databases 152, 153, and a user preference database 107 are shown, although more or fewer of such databases may be accessed by ambient help application 105 without exceeding the scope of the invention as disclosed herein. Learning resource databases 152, 153 are databases of video- and text-based learning resources for software application 104. Examples of learning resources residing in learning resource databases 152, 153 include formal training videos and textual or diagrammatic help documentation produced by the developer of software application 104. In addition, learning resource databases 152, 153 may include tutorial videos and help documentation for software application 104 produced by individuals and third parties. Given the prevalence of tutorial videos available via the Internet, e.g., from YouTube, etc., there are generally far more independently produced learning resources for a given soft ware application than those produced by the developer of the software application, so in a preferred embodiment, the content of learning resource databases 152, 153 is not exclusively limited to instructional material for software application 104 produced by the developer of software application 104.

In one embodiment, learning resource database 152 contains learning resources produced by the developer of software application 104 and learning resource database 153 contains learning resources produced by third parties. The learning resources residing in learning resource database 152 may include video- and text-based instructional material for software application 104. The learning resources residing in learning resource database 153 may be a cache of video- and text-based instructional material for software application 104 that has been collected using searches of one or more sources, e.g., the Internet, consumer publications related to the use of software application 104, and the like. Alternatively, learning resource database 153 may simply be "virtual" database that includes an up-to-date listing of all videos and/or other learning resources related to software application 104 currently available and pointers to such materials, so that the learning resources themselves do not reside in learning resource database 153 and instead are accessed from their original location by ambient help application 105 via network 110. One of skill in the art will appreciate that the information contained in learning resource databases 152, 153 is not necessarily static and may be updated over time as more learning resources related to software application 104 become available from the developer of software application 104 and third parties.

In some embodiments, learning resources contained in learning resource databases 152, 153 may include enhancements, such as timeline tagging and/or thumbnails that help an end-user to quickly locate a portion of a video that is germane to the end-user's interest. A video with timeline "tagging," includes a timeline display of the video having tags that indicate what commands or other features associated with software application 104 are being described in the video and when. In some embodiments, the tags may include iconic information, such as a symbol associated with the command in question, and/or a textual label. Multiple thumbnails may also be displayed proximate a video timeline as part of such enhanced videos to help the end-user select a desired portion of the video quickly.

In some embodiments, learning resources included in learning resource databases 152, 153 may include a plurality of web pages. In such an embodiment, each command or feature of software application 104 may have a dedicated web page associated therewith, so that any text-based learning resources displayed for the end-user will have consistent formatting in the ambient help GUI. In such embodiments, the end-user can more easily find helpful information from the learning resources being displayed by ambient help application 105.

In some embodiments, video-based learning resources, herein referred to as "videos," may be produced with timeline tagging and other enhancements, as is common with videos produced by the developer of software application 104. In other embodiments, such enhancements may be provided by ambient help application 105 when new videos are located and added to either learning resource database 152 or 153. In yet another embodiment, enhancement information related to videos for software application 104, i.e., timeline tags, thumbnails, etc., resides in a separate database accessible to ambient help application 105. In such an embodiment, the unenhanced versions of the videos may reside in their original locations and ambient help application 105 retrieves the appropriate enhancement information separately prior to presentation of a video to an end-user.

Resource relevance database 151 is a database that includes metadata related to the learning resources residing in or referenced by learning resource database 152 or 153. The metadata in resource relevance database 151 may include key words that occur in each learning resource, software application 104 commands that are referenced by each learning resource, end-user expertise level the learning resource is most appropriate for, quality ratings assigned to each learning resource by other users, and/or or predetermined relevance scores for each learning resource. Key words may be taken from the learning resource title, description, or text, closed-captioning incorporated into a video, and/or comments made by other end-users with respect to the learning resource. Quality ratings may be assigned to a learning resource on-line, e.g., via YouTube, etc., by other end-users of software application 104 who have accessed the particular learning resource. Each relevance score quantifies the relevance of the learning resource to specific commands or other features of software application 104, and an exemplary algorithm for the determination of such relevance scores is described below. When such metadata is collected into resource relevance database 151, ambient help application 105 can quickly locate learning resources in real-time that are likely to be relevant to the current activity of the end-user, since the hundreds to thousands of potential learning resources do not have to be individually examined by ambient help application 105 each time the end-user of software application 104 uses a different command.

In some embodiments, resource relevance database 151 includes predetermined relevance scores for learning resources to facilitate the comparison of the relevance of a large number of learning resources in response to end-user activity in software application 104 in real-time. In this way, computation resources do not have to be committed to perform relevance calculations for each learning resource residing in learning resource database 152 or 153 that may be related to a command or feature currently being used by the end-user. In FIG. 1, resource relevance database 151 is shown connected to computing device 100 via network 110. In other embodiments, resource relevance database 151 may reside in memory block 103 for faster access by ambient help application 105.

In operation, an end-user of computing device 100 faces software application display device 120 and performs tasks in software application 104 normally. Concurrently, ambient help application 105 automatically presents help content relevant to the commands or other features the end-user is currently working with in software application 104. Such help content may include a combination of one or more text- and video-based learning resources, and is displayed on ambient help display device 130, which may be positioned peripherally with respect to the point of view of the end-user. It is noted that the help content displayed on ambient help display device 130 is not selected based on any specific request for help information by the end-user, but is instead automatically selected and displayed by ambient help application 105.

Ambient help application 105 is configured to select and display the most relevant learning resources available to the end-user of software application 104 to maximize the potential for opportunistic learning on the part of the end-user. To that end, ambient help application 105 searches available learning resources, for example in learning resource databases 152, 153, and/or on the Internet, quantifies the relevance of each learning resource with respect to the current application context, and displays the most relevant learning resources on ambient help display device 130. In some embodiments, ambient help application 105 accesses resource relevance database 151 for metadata associated with available learning resources, such as predetermined relevance scores for available learning resources and/or information used to calculate relevance scores, such as key words that occur in each learning resource.

Figure 2:
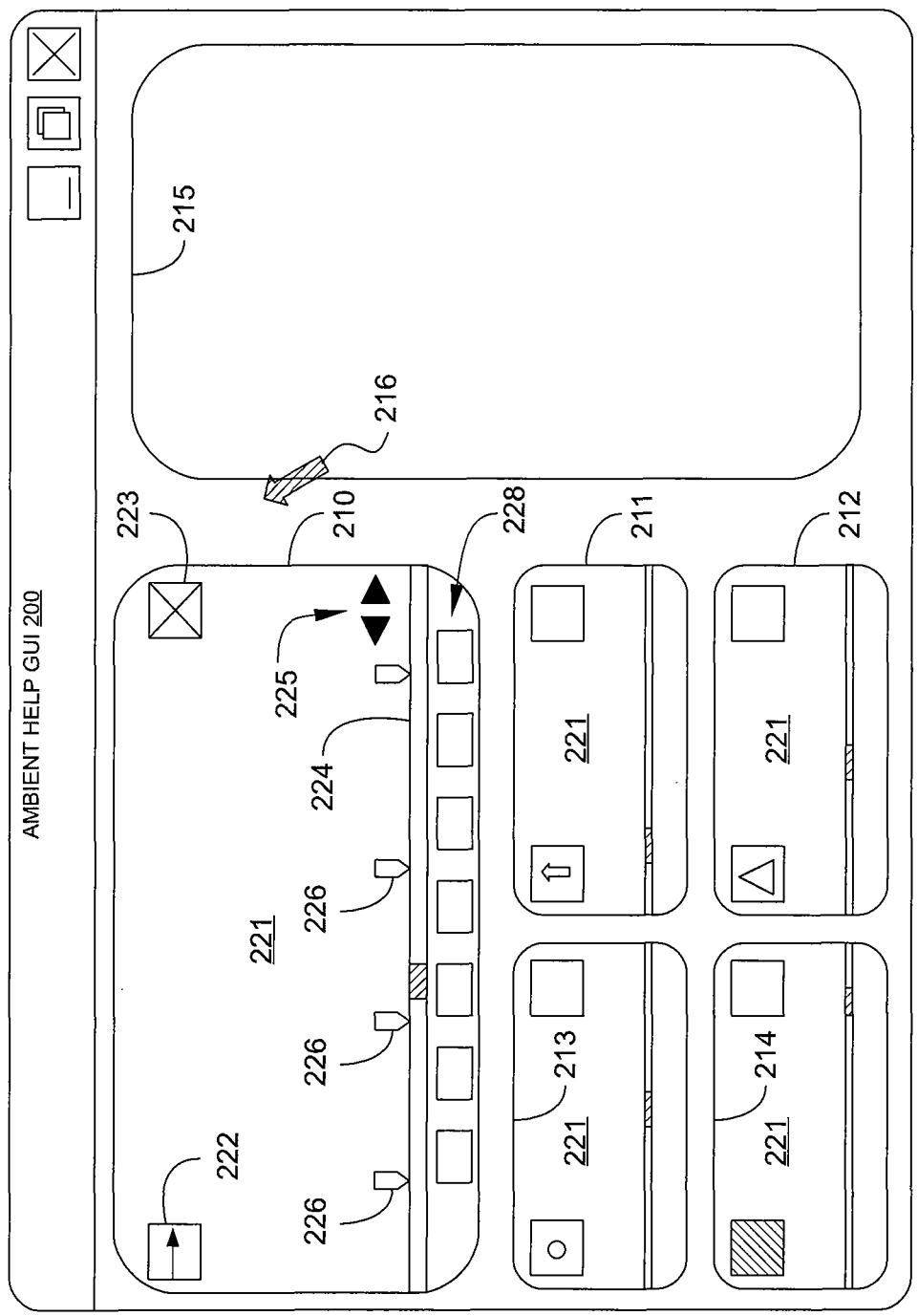
FIG. 2 schematically illustrates an exemplary embodiment of an ambient help GUI displayed on an ambient help display device.

FIG. 2 schematically illustrates an exemplary embodiment of an ambient help GUI 200 displayed on ambient help display device 130. Ambient help GUI 200 is generated by ambient help application 105 and includes a plurality of help display windows 210-215 and a cursor 216. Ambient help GUI 200 represents just one example of an ambient help GUI that could be generated by ambient help application 105. Those skilled in the art will recognize that different configurations of ambient help applications may generate different types of ambient help GUIs. Each of help display windows 210-215 displays a learning resource that has been selected by ambient help application 105 as being relevant with respect to the current application context of software application 104 as an end-user utilizes software application 104. An exemplary algorithm for determining relevance with respect to current application context is described below. Those skilled in the art will understand that any software program or programs, any hardware device or devices, or any combination of software and hardware device(s) configured to generate ambient help GUI 200 described in FIG. 2 are within the scope of the invention described herein.

Help display windows 210-214 are reserved for playing video-based learning resources, such as third-party instructional videos posted on YouTube or training videos produced by the developer of software application 104. Each of help display windows 210-214 may include a video display region 221, a tool icon 222, a "check box" 223, a video timeline 224, and transport controls 225. Video display region 221 represents the region in which a relevant video is displayed by ambient help application 105. Tool icon 222 is an iconic indicator of what command or feature of software application 104 is currently being described in video display region 221. In some embodiments, tool icon 222 may also include a text label. Check box 223 is an active GUI button that can be clicked by the end-user to indicate to ambient help application 105 that the end-user would like to keep the corresponding video playing to completion and/or unmuted. Video timeline 224 graphically indicates the duration and current frame location of the video being played in video display region 221.

In some embodiments, video timeline 224 may include timeline tags 226, which graphically indicate the frame location in the current video at which a command or feature of software application is described. In some embodiments, timeline tags 226 indicate the frame at which such a description begins. In other embodiments, timeline tags 226 indicate the entire block of time in the video in which such a description takes place. In some embodiments, timeline tags 226 are iconic indicators of what command or feature is being described, and in other embodiments, timeline tags are textual labels. In some embodiments, videos may begin playing at the frame location indicated by one of timeline tags 226, so that the video immediately presents useful information to the end-user. Transport controls 225 may include typical video navigation GUI buttons, e.g., fast forward, rewind, as well as navigation buttons for skipping forward to the next video selected by a relevance algorithm or for returning to a previously played video.

Help display window 210 may be configured to be the primary display window for video-based learning resources, and is therefore larger and located more prominently than the secondary help display windows 211-214. In some embodiments, help display 210 may include thumbnails 228 of different frame locations of the current video to provide more visual cues for the end-user to quickly determine resources of interest. Alternatively, each of help display windows 210-214 may include thumbnails 228, provided the size of ambient help GUI allows for these features.

In the embodiment of ambient help GUI illustrated in FIG. 2, help display window 215 is reserved for one or more text-based learning resources. In such an embodiment, help display 215 may be configured as a web page having consistent formatting for each command or feature of software application 104 presented thereby. For example, the format of help display 215 may be modeled after the command reference pages published by the developer of software application 104 for software application 104. In some embodiments, at least one text-based learning resource is displayed in conjunction with a plurality of video-based learning resources. In other embodiments, a text-based learning resource is displayed when a relevance algorithm determines that the text-based learning resource is one of the most relevant learning resources available.

To minimize potential distractions to the end-user of application 104, videos being played in help display windows 210-215 may have muted audio and dimmed video whenever the end-user has positioned cursor 216 over the display area allocated for software application 104, i.e., somewhere on software application display device 120. In addition, the frame rate of these videos may also be reduced, for example to one frame every seconds. A smooth fade between frames may be used, for example distributed over about one second, to further avoid the distraction of new frames constantly being flashed onto help display windows 210-215 when the end-user is engaged in utilizing software application 104. It is noted that selection of check box 223 may override the muting and reduced frame rate presentation of videos that normally occurs when the end-user has positioned cursor 216 over the display area allocated for software application 104. As new learning resources are displayed by ambient help application 105, smooth fade out of the expiring video and into the new video may be used.

One of skill in the art will appreciate that more help display windows in ambient help display device 130 can expose the end-user to more learning resources, but as such display windows are reduced in size, the likelihood of the videos so displayed being watched by the end-user is also reduced. According to embodiments of the invention, varying configurations of the size, shape, and position of help display windows may be used to optimize the number of different videos shown versus the viewing size of the videos being presented to maximize the useful information presented the end-user. In the embodiment of ambient help GUI 200 illustrated in FIG. 2, five display windows are used to display videos, i.e., help display windows 210-214. Help display window 210 is the primary display window and has a resolution of 970 by 536, whereas help display windows 211-215 are positioned below the primary display window and have respective resolution of 490 by 278. Other combinations and sizes of help display windows are considered within the scope of the invention and may vary from the embodiment illustrated in FIG. 2 due to different screen size and shape, video resolution, and other factors. In some embodiments, smaller help display windows, such as help display windows 211-214, may not include all features, such as thumbnails 228 or timeline tags 226.

As noted above in conjunction with FIG. 1, ambient help application 105 selects learning resources for display in ambient help GUI 200 based on the relevance of the learning resources with respect to application context, and not in response to specific requests for information by the end-user. According to embodiments of the invention, relevance of each available learning resource may be quantified using a relevance algorithm that takes into account one or more aspects of application context in conjunction with content of the learning resource.

An exemplary embodiment of a relevance algorithm that may be used to compute relevance scores for video-based learning resources is now described. A similar algorithm can be applied for determining the relevance of text-based learning resources. For clarity, the contextual information taken into account by the example relevance algorithm is primarily what commands are entered by the end-user in software application 104, and the relevance of each video is computed with respect to this contextual information. Thus, in the example relevance algorithm described herein, other contextual information, such as end-user proficiency level and document content, are omitted from relevance computations. One of skill in the art, upon reading the disclosure herein, can readily devise a relevance algorithm that incorporates such elements.

At the time ambient help application 105 detects that the end-user has issued a new command, c, a relevance score, S(v,c), is calculated for each available video, v, using Equation 1:

$$S(v, c) = v.title(c) \times 10 + v.keywords(x) \times 8 + v.description(x) \times 7 + \sum (v.comment(x) \times 6 + 0.02 + v.commands(x) \times 12 \quad (1)$$

where v.title(c) is set to 1 if the title of the video contains the command name c, and is set to 0 if not. Similarly, v.keywords (c) is set to 1 if keywords associated with the video contain the command name c; v.description(c) is set to 1 if the command name c is found in a description associated with the video; v.comments(c) is set to 1 if command name c appears in comments associated with the video; and v.commands(c) is set to 1 if command c is used in the command stream. Thus, in Equation 1, having command c used in the command stream is worth more than having command c in the title, which is in turn more valuable than having command c mentioned in the keywords, description or comments. It is noted that in Equation 1, 0.02 points were added for each user comment associated with the video to account for generally popular videos. One of skill in the art can readily incorporate other relevance factors associated with a video into Equation 1, when applicable.

Because the variables in Equation 1 are relatively static in time, in some embodiments, relevance score, S(v,c) of each available video with respect to a given command can be calculated before the end-user utilizes software application 104. In such an embodiment, such scores can be stored in resource relevance database 151 as predetermined relevance scores. Consequently, only time-weighting and similar time-transient factors need be calculated for each available video in real time by ambient help application 105.

In some embodiments, the occurrence of previously issued commands may figure into the relevance calculation for each video. For example, a relevance score for each video, R(v), may be calculated for all available videos using Equation 2, which weights the current command entered by the end-user most highly and weights the previous four commands $c_i$ with a decreasing power function:

$$R(v) = \sum_{i=1}^{5} S(v, c_i) \times (6 - i)^2 \quad (2)$$

Figure 3:
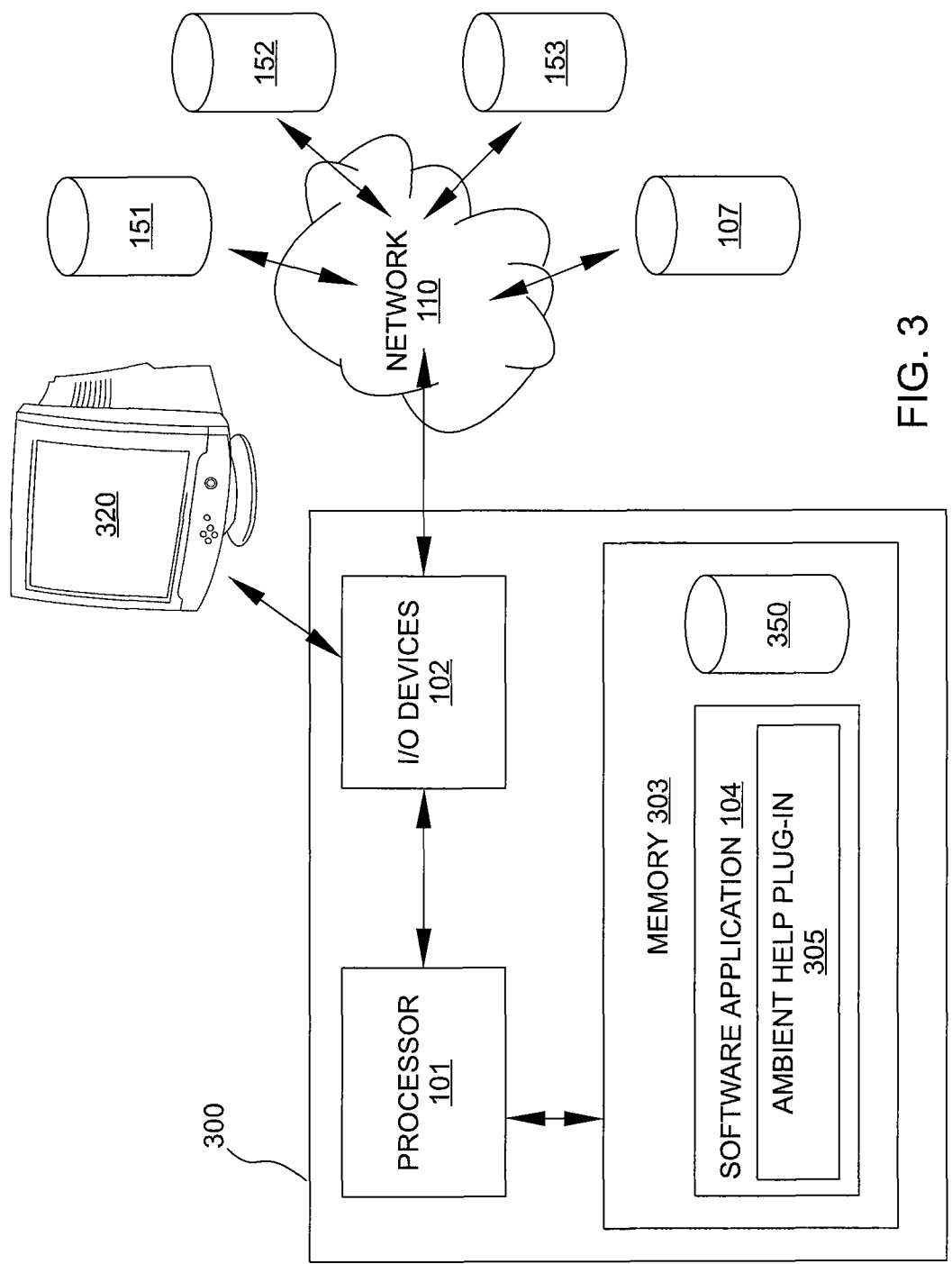
FIG. 3 illustrates a block diagram of a computing device having an alternative configuration for implementing one or more embodiments of the present invention.

FIG. 3 illustrates a block diagram of a computing device 300 having an alternative configuration for implementing one or more embodiments of the present invention. Computing device 300 is substantially similar in organization to computing device 100 in FIG. 1 with the exception of memory block 303 and I/O devices 302.

Memory 303 includes software application 104, but does not include ambient help application 105 as a separate process that is run by processor 101. As shown, an ambient help plug-in 305 is included in software application 104, so that the functionality of the ambient help process is incorporated into software application 104. Memory 303 also includes a database 350 that may include a user preference database similar to user preference database 106 and/or a resource relevance database similar to resource relevance database 151. Thus, database 350 may be configured to store metadata related to the large number of learning resources that are located remotely from computing device 300, thereby expediting real-time relevance computations and searching functions performed by ambient help plug-in 305.

Figure 4:
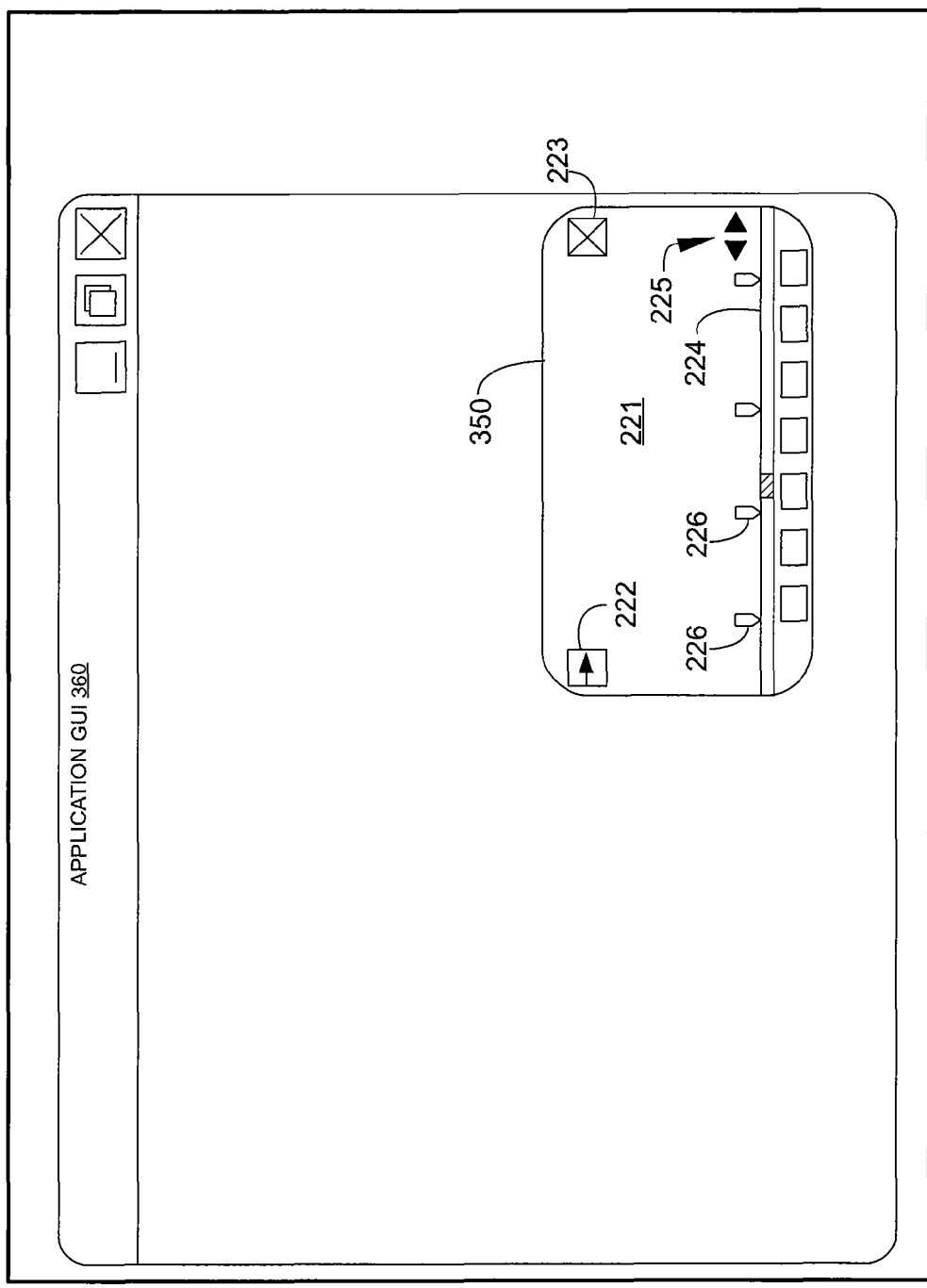
FIG. 4 schematically illustrates an exemplary embodiment of an ambient help GUI displayed on a single display with an application GUI.

I/O devices 302 of computing device 300 may only include a single display device 320. Consequently, ambient help plug-in 305 displays an application GUI for software application 104 and an ambient help GUI on single display device 320. FIG. 4 schematically illustrates an exemplary embodiment of an ambient help GUI 350 displayed on a single display 320 along with an application GUI 360. As shown, ambient help GUI 350 may include a help display window similar in configuration to help display window 210, and may include video display region 221, tool icon 222, check box 223, video timeline 224, transport controls 225, and the like. Due to the reduced available screen area on single display 320, ambient help GUI 350 may only display a single learning resource instead of a plurality of learning resources. Alternatively, ambient help GUI 350 may be minimized to an iconic indicator and/or a textual line display that alerts the end-user to what learning resource or resources are available while occupying very little of single display 320 and/or application GUI 360.

Figure 5:
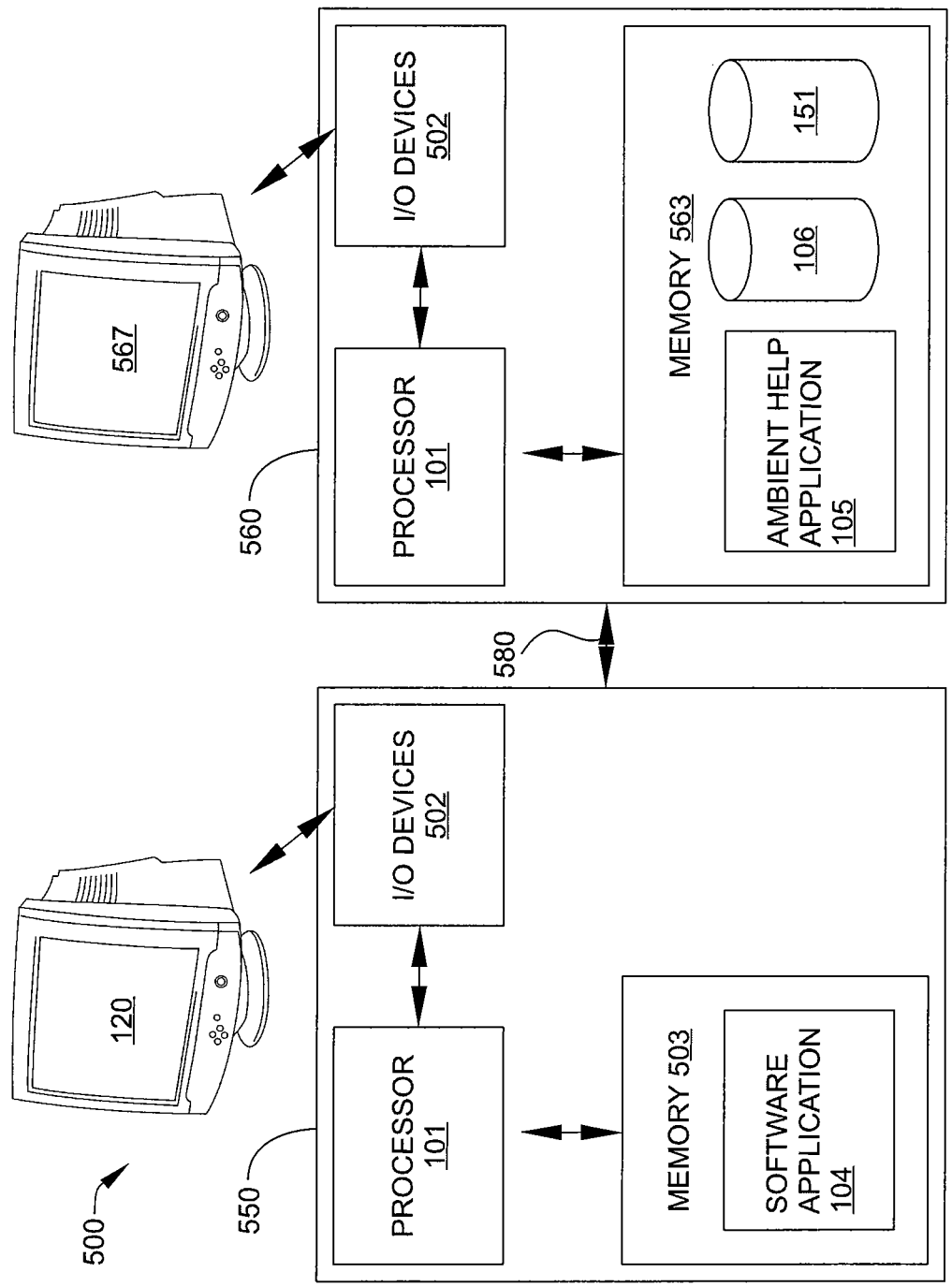
FIG. 5 illustrates a block diagram of another embodiment of a computing system configured to implement one or more embodiments of the present invention.

FIG. 5 illustrates a block diagram of another embodiment of a computing system 500 configured to implement one or more embodiments of the present invention. Computing system 500 includes a computing device 550 and a secondary computing device 560. Computing device 550 is substantially similar in organization to computing device 100 in FIG. 1, except that memory 503 does not contain ambient help application 105 and I/O devices 502 do not include an ambient help display device. Secondary computing system 560 includes a processor 101, I/O devices 102, and a memory block 563. I/O devices 102 include an ambient help display 567. Memory block 563 includes ambient help application 105 and, in some embodiments, user preference database 106 and resource relevance database 151, in order to expedite relevance computations by ambient help application 105.

Secondary computing device 560 may be any type of computing device configured to run ambient help application 105 and display output to the end-user of software application 104, such as a desktop computer, a laptop computer, a smart phone, a PDA, or a tablet computer. Secondary computing device 560 is networked in some fashion to computing device 550 via network connection 580, which can be a wireless or hard-wired network connection, so that ambient help application 105 can monitor end-user activity and provide relevant learning resources as described above.

Figure 6:
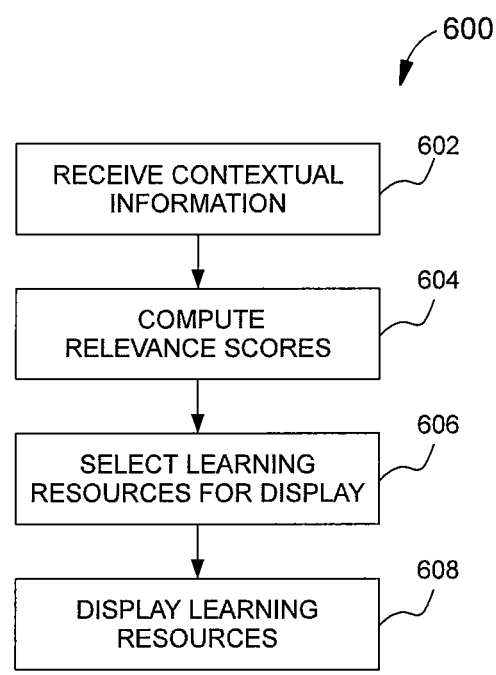
FIG. 6 is a flowchart of method steps for providing instructional material to an end-user of a software application, according to one embodiment of the present invention.

FIG. 6 is a flowchart of method steps for providing instructional material to an end-user of a software application, according to one embodiment of the present invention. Although the method steps are described in conjunction with the system of FIG. 1, persons skilled in the art will understand that any system configured to perform the method steps, in any order, is within the scope of the invention.

As shown, the method 600 begins at step 602, where ambient help application 105 receives contextual information associated with software application 104. The contextual information associated with software application 104 may include an indication that a tool or command associated with software application 104 is being used by the end-user, an end-user preference associated with previously displayed learning resources, the experience level of the end-user with software application 104, application state information related to software application 104, and the like. Ambient help application 105 may receive the contextual information directly from software application 104, from a plug-in associated with the software application, or from an application running independently of software application 104 that is monitoring end-user activities in software application 104. In some embodiments, ambient help application 105 acts as the independently running application monitoring end-user activity.

At step 604, ambient help application 105 computes relevance scores for each of a plurality of available learning resources based on the relevance of each learning resource to the contextual information received in step 602. In some embodiments, the relevance scores can be partially computed for each learning resource prior to the receipt of contextual information in step 602. In some embodiments, time-transient factors are included in the relevance scores computed in step 604, e.g., how long learning resources have currently been displayed.

At step 606, based on the relevance scores determined in step 604, ambient help application 105 selects one or more learning resources for display to the end-user. The number and type of learning resources selected may vary according to different embodiments of the invention. For example, in some embodiments, only video-based learning resources may be selected for display. In other embodiments, multiple video-based and a single text-based learning resource may be selected for display.

At step 608, ambient help application 105 displays to the end-user the one or more selected learning resources in a help space within a display window, where the learning resources displayed are those having the highest computed relevance score. Depending on the size of the help space, the one or more learning resources may be displayed as thumbnails, reduced-size videos, or full-sized videos. In some embodiments, some or all of the learning resources may be displayed as an iconic indicator or a textual line display that can be expanded when selected by the end-user.

In sum, an ambient help application provides relevant instructional information to an end-user of a software application continuously and in a non-distracting fashion. The learning resources provided to the end-user may be selected based on relevance to the latest command and/or feature of the software application the end-user is utilizing as well as other contextual information related to the software application. Advantageously, instructional information related to end-user activity is displayed without the end-user interrupting current work and making an explicit request therefor. Another advantage of the present invention is that an end-user can be exposed to a large number of different learning resources, including those unknown to the end-user, so that the end-user can benefit from exposure to such learning resources regardless of end-user proficiency level. Yet another advantage of the present invention is that the instructional material displayed to the end-user can be selected based in part on end-user-specific information, such as learning resource viewing history, personal preferences, etc.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for providing instructional information to an end-user of a software application, the method comprising:
   receiving contextual information associated with the software application;
   computing a relevance score for each learning resource in a plurality of learning resources based on a measure of the relevance of the learning resource to the contextual information;
   based on the relevance scores, selecting one or more learning resources to present to the end-user; and
   displaying to the end-user the one or more learning resources in a help space within a display window,
   wherein the contextual information includes at least one of an indication that a software tool, which is associated with the software application, is being used by the end-user, an end-user preference associated with a previously displayed learning resource, or an experience level of the end-user with respect to the software application.

2. The method of claim 1, wherein the contextual information includes an indication that a software tool associated with the software application is being used by the end-user.

3. The method of claim 1, wherein one or more of the learning resources for which relevance scores are computed are identified by performing a search.

4. The method of claim 3, wherein the one or more learning resources are identified by searching the Internet or by searching a database of learning resources.

5. The method of claim 4, wherein the database of learning resources includes a relevance score for each learning resource referenced in the database, and, for a given learning resource, the relevance score is based on at least one of a command associated with the software application and referenced by the learning resource, a comment associated with the learning resource and made by another end-user, a use history of the learning resource associated with the end-user, or a reference term included in closed captioning text associated with the learning resource.

6. The method of claim 1, wherein at least one of the one or more learning resources comprises a video-based learning resource or a text-based learning resource.

7. The method of claim 1, wherein a learning resource having the greatest relevance score is displayed in a primary display region of the help display space.

8. The method of claim 7, wherein a learning resource having a relevance score that is lesser than the greatest relevance score is displayed as a thumbnail image or an icon in the help display space.

9. The method of claim 8, wherein the icon represents a software tool associated with the software application that is being described by the learning resource having the lesser relevance score.

10. The method of claim 1, wherein the learning resource for which a relevance score is being computed comprises a video-based learning resource concurrently being displayed in the help space, and the step of computing the relevance score includes weighting the relevance score of a video-based learning resource that is currently being displayed in the help space based on how long the video-based learning resource has been displayed in the help space.

11. A computer-readable medium including instructions that, when executed by a processing unit, cause the processing unit to provide instructional information to an end-user of a software application, by performing the steps of:
receiving contextual information associated with the software application;
computing a relevance score for each learning resource in a plurality of learning resources based on a measure of the relevance of the learning resource to the contextual information;
based on the relevance scores, selecting one or more learning resources to present to the end-user; and
displaying to the end-user the one or more learning resources in a help space within a display window,
wherein the contextual information includes at least one of an indication that a software tool, which is associated with the software application, is being used by the end-user, an end-user preference associated with a previously displayed learning resource, or an experience level of the end-user with respect to the software application.

12. The computer-readable medium of claim 11, wherein the contextual information includes an indication that a software tool associated with the software application is being used by the end-user.

13. The computer-readable medium of claim 11, wherein one or more of the learning resources for which relevance scores are computed are identified by performing a search.

14. The computer-readable medium of claim 13, wherein the one or more learning resources are identified by searching the Internet or by searching a database of learning resources.

15. The computer-readable medium of claim 14, wherein the database of learning resources includes a relevance score for each learning resource referenced in the database, and, for a given learning resource, the relevance score is based on at least one of a command associated with the software application and referenced by the learning resource, a comment associated with the learning resource and made by another end-user, a use history of the learning resource associated with the end-user, or a reference term included in closed captioning text associated with the learning resource.

16. The computer-readable medium of claim 11, wherein at least one of the one or more learning resources comprises a video-based learning resource or a text-based learning resource.

17. The computer-readable medium of claim 11, wherein a learning resource having the greatest relevance score is displayed in a primary display region of the help display space.

18. The computer-readable medium of claim 17, wherein a learning resource having a relevance score that is lesser than the greatest relevance score is displayed as a thumbnail image or an icon in the help display space.

19. The computer-readable medium of claim 11, wherein the learning resource for which a relevance score is being computed comprises a video-based learning resource concurrently being displayed in the help space, and the step of computing the relevance score includes weighting the relevance score of a video-based learning resource that is currently being displayed in the help space based on how long the video-based learning resource has been displayed in the help space.

20. A computing device, comprising:
a processing unit configured to:
receive contextual information associated with the software application;
compute a relevance score for each learning resource in a plurality of learning resources based on a measure of the relevance of the learning resource to the contextual information;
based on the relevance scores, select one or more learning resources to present to the end-user; and
display to the end-user the one or more learning resources in a help space within a display window,
wherein the contextual information includes at least one of an indication that a software tool, which is associated with the software application, is being used by the end-user, an end-user preference associated with a previously displayed learning resource, or an experience level of the end-user with respect to the software application.

* * * * *